US006466660B1

(12) United States Patent
Merriam

(10) Patent No.: US 6,466,660 B1
(45) Date of Patent: Oct. 15, 2002

(54) METHOD AND APPARATUS FOR RETROACTIVELY UPDATING A COMMUNICATION BILLING SYSTEM

(75) Inventor: Charles Merriam, Sunnyvale, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/312,307

(22) Filed: May 14, 1999

(51) Int. Cl.$^7$ .............................................. H04M 15/00
(52) U.S. Cl. ....................... 379/126; 455/407; 455/408; 379/130
(58) Field of Search ................................. 379/112, 113, 379/114, 115, 120, 114.03, 114.04, 114.08, 115.01, 115.02, 121.02, 121.04, 121.05, 126, 121.01, 125; 455/406, 405, 407, 408

(56) References Cited

U.S. PATENT DOCUMENTS

| | | | | | |
|---|---|---|---|---|---|
| 5,517,549 A | * | 5/1996 | Lee | ............................. | 379/114 |
| 5,517,555 A | * | 5/1996 | Amadon et al. | ............ | 379/114 |
| 5,519,769 A | * | 5/1996 | Weinberger et al. | ........ | 379/112 |
| 5,706,330 A | * | 1/1998 | Bufferd et al. | .............. | 379/114 |
| 5,734,705 A | * | 3/1998 | Schlossman et al. | ....... | 379/117 |
| 5,799,072 A | * | 8/1998 | Vulcan et al. | .............. | 379/114 |
| 5,812,641 A | * | 9/1998 | Kanoh et al. | ................ | 379/114 |
| 5,822,415 A | * | 10/1998 | Gordon | ....................... | 379/140 |
| 6,195,420 B1 | * | 2/2001 | Tognazzini | .................. | 379/130 |
| 6,243,574 B1 | * | 6/2001 | McGregor et al. | .......... | 379/144 |
| 6,304,635 B1 | * | 10/2001 | Iwami et al. | .......... | 379/114.08 |

* cited by examiner

Primary Examiner—Curtis Kuntz
Assistant Examiner—Rexford Barnie
(74) Attorney, Agent, or Firm—Hickman Palermo Truong & Becker LLP; Bobby K. Truong

(57) ABSTRACT

During peak usage times in a communications system, a communications control system and a billing system are required to handle a very large volume of communications from a large number of communications devices. Due to the large s volume, the control system and billing system are often overburdened, causing them to not record each and every communication. As a result, some of the communications conducted during peak times are not recorded and hence are not billed to customers, thereby causing a loss in potential revenue. The present invention provides a solution to this problem. Namely, each communications device is adapted to maintain a log of the communications conducted using that communications device. This log information is communicated to the control system at some later time (probably during an off-peak period) to enable the control system to retroactively update the billing system. The present invention provides the control system with the luxury of not having to register a communication with the billing system at the time that the communication is being conducted. Instead, the control system may choose to defer the registration process until a later time, knowing that it can always obtain the log information from the communications device that was used to conduct the communication. Thus, with the present invention, even if the control system fails to register a communication with the billing system during a peak usage period, no harm is done. Billing information for that communication can still be retroactively captured. In this manner, revenue loss caused by failure to immediately register a communication is prevented.

16 Claims, 6 Drawing Sheets

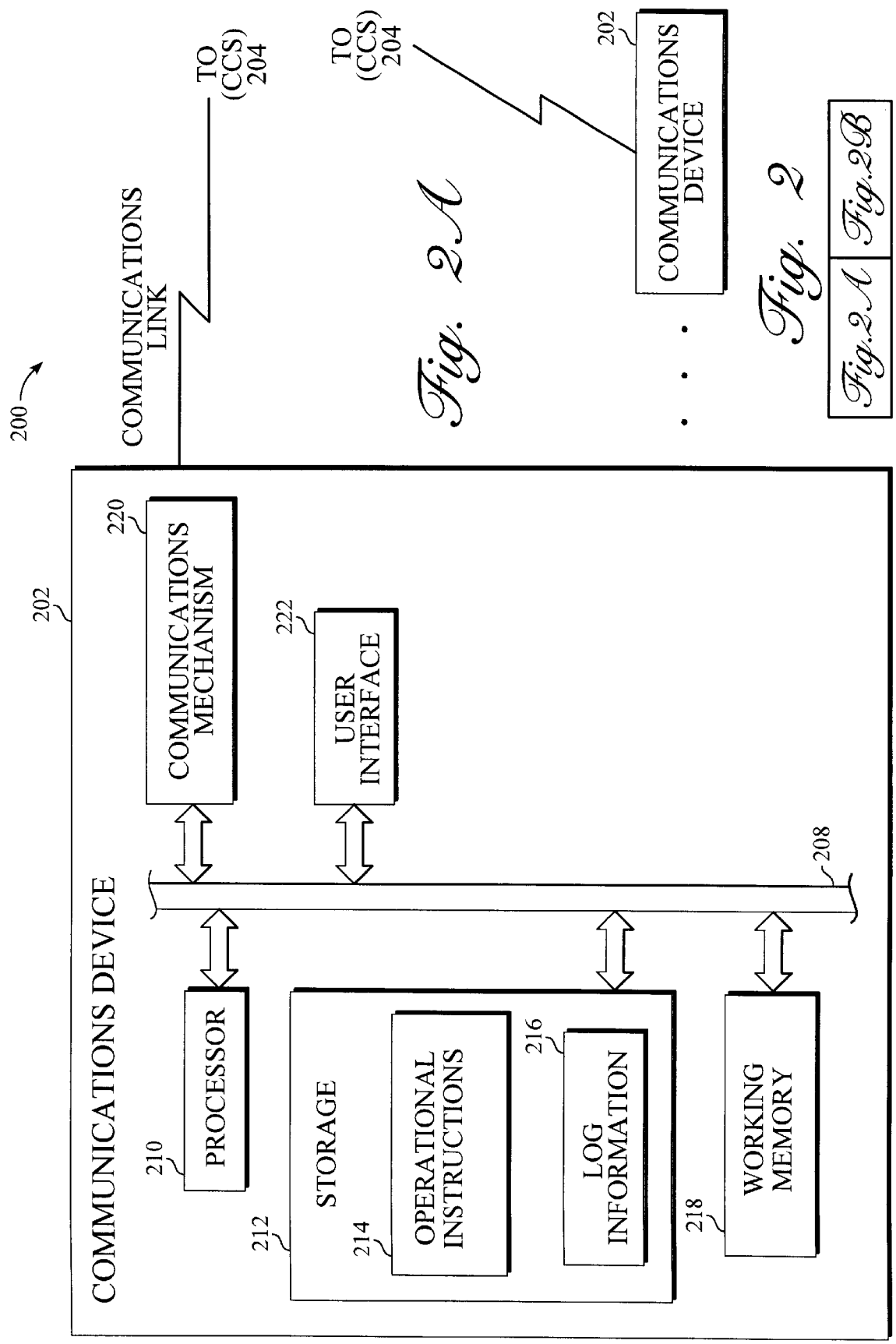

| COMMUNICATION ID | ADDRESS OF OTHER DEVICE | START TIME | END TIME | ACK | OTHER |
|---|---|---|---|---|---|
| 97 | X | $t_1$ | $t_2$ | Y | ... |
| 98 | Y | $t_3$ | $t_4$ | N | ... |
| 99 | Z | $t_5$ | $t_6$ | N | ... |
| ... | ... | ... | ... | ... | ... |

Fig. 3

METHOD AND APPARATUS FOR RETROACTIVELY UPDATING A COMMUNICATION BILLING SYSTEM

BACKGROUND

This invention relates generally to communications systems and more particularly to a method and apparatus for retroactively updating a communication billing system.

In the communications industry, service providers such as local, long distance, and wireless telephone companies generate revenue on a per use basis. That is, rather than billing customers a flat fee each month, service providers typically charge customers based upon the customers' actual use of the services. In order to implement such a fee scheme, providers typically need to implement a recording system for capturing information pertaining to each communication conducted using the provider's services or networks. This information is needed in order to properly and accurately bill customers for each communication.

A typical communications system having such a recording system is shown in FIG. 1, wherein the system 100 consists of a plurality of communications devices 104, a communications control system 102, and a billing system 106. In the system of FIG. 1, the control system 102 typically performs two functions. First, it establishes a communications link between two or more of the communications devices 104 to enable the devices 104 to conduct a communication. Second, it submits information pertaining to the communication to the billing system 106. The billing system 106 in turn stores the information, which is later used to bill the proper customer for the communication.

In system 100, a typical communication is conducted as follows. Initially, one of the communications devices 104 (referred to as the initiating device) sends a request to the control system 102 for a communications link. This request typically includes the identification of the initiating device and the address (e.g. the phone number) of the device with which it wishes to communicate (referred to as the destination device). In response, the control system 104 sends the identification and the address to the billing system 106 for verification. If the billing system 106 determines that the initiating device is not authorized to invoke the services of the communications system 100, then no communications link is established and no communication is conducted. On the other hand, if the billing system 106 verifies that the initiating device is authorized to invoke the system's services, then it instructs the control system 102 to proceed with establishing the requested communications link. Further, the billing system 106 updates the billing information by storing therein information pertaining to the new communication, including the identification of the initiating device, the address of the destination device, and the time at which the communication was initiated.

Once the control system 102 establishes a communications link between the two or more devices, the devices are allowed to conduct a communication. This communications link is maintained until one of the devices terminates the communication. When that occurs, the control system 102 sends another message to the billing system 106, this time informing the system 106 that the communication has been terminated. In response, the billing system 106 updates the billing information by storing the time at which the communication was terminated. In this manner, all information pertinent to the billing of the communication is recorded.

The system 100 of FIG. 1 is fairly effective when the control system 102 and the billing system 106 are working within their normal capacities. However, when their capacities are strained or exceeded, system 100 is much less effective. During peak usage times, for example, the control system 102 and the billing system 106 are required to handle a very large volume of communications from a large number of devices. This high volume strains the capacities of the control system 102 and the billing system 106, and when strained, they fail to record some of the communications conducted using the communications system 100. This failure may be due to the control system 102 being overburdened and hence being unable to both establish communications links and submit billing information to the billing system 106, or it may be due to the billing system 106 (which is often an older and, hence, slower system) being unable to operate at a sufficient rate. Whatever the cause, the end result is that communications are sometimes not recorded. If information pertaining to a communication is not recorded, then the customer is not billed for that communication, and if the customer is not billed for the communication, then the service provider suffers a loss of potential revenue. For individual communications, this revenue may not be much, but for large amounts of communications, this loss can be quite significant. It has been estimated that failure to record communications during peak times costs communications providers millions of dollars each year.

One possible solution to this problem is to simply increase the capacities of the control system 102 and the billing system 106. For various reasons, however, such as lack of resources, this solution is often not viable. Besides, even if the capacities of the control system 102 and the billing system 106 were increased, demand will usually grow to meet the capacity, so that soon capacity will have to be increased again. Increasing system capacity is not a permanent solution. What is needed instead is an improved scheme for capturing billing information for communications.

SUMMARY OF THE INVENTION

The present invention provides an improved mechanism for capturing information pertaining to communications. The present invention is based, at least partially, upon the observation that the burden of collecting communication information need not be imposed solely upon the communications control system and the billing system. Rather, the burden may be shared with each one of the communications devices in the communications system.

In accordance with this observation, the present invention provides a communications device and a communications control system having special capabilities. Specifically, the communications device is endowed with additional processing and storage capabilities to enable it to maintain a log of communications conducted using the device. The communications device is further endowed with additional processing capability to enable it to interact with the control system to provide the log information to the control system after the communications have already been conducted and terminated. In turn, the control system is endowed with additional processing capability to enable it to properly interact with the communications device. More specifically, the control system is given the ability to determine the appropriate time for receiving log information, and the ability to receive log information from the communications device and to pass it on to the billing system to retroactively update the billing system. Together, the communications device and the control system implement the methodology of the present invention.

In operation, each time a communication is conducted using the communications device, log information pertaining to the communication is stored within the device. This log information may include a communication identifier, an address of another communications device, and an indication of the duration of the communication. Then, at some time after one or more of the communications have been conducted and terminated, the communications device communicates with the control system to grant the control system an opportunity to receive the log information.

Given this opportunity, the control system may or may not wish to receive the log information at that time. In determining whether to receive the log information, the control system takes into account various factors, including the current load on the system. If the current load is heavy, then the control system may defer receiving the log information until a later time. On the other hand, if the control system currently has sufficient capacity, then the control system receives and processes the log information. In doing so, the control system passes the log information on to the billing system. The billing system thereafter uses the log information to update the billing information in the billing system. The billing information is thus retroactively updated.

An important point to note is that, because the log information is maintained by the communications device, it is not necessary for the control system and the billing system to capture information pertaining to a communication at the time that the communication is conducted. Instead, the control system may choose to defer the information recordation process until a later time, knowing that it can always obtain the log information from the communications device. This gives the control system the great luxury of knowing that even if it fails to register a communication with the billing system during a peak usage period, no harm is done. Billing information for that communication can still be retroactively captured. Thus, the present invention prevents the loss of information pertaining to communications, even communications conducted during peak periods. As a result, revenue loss caused by loss of communication information is prevented.

BRIEF DESCRIPTION OF THE DRAWINGS

FIGS. 2a and 2b together comprise a detailed block diagram of a communications system in which the present invention may be implemented.

FIG. 3 is a diagram of a sample table in which the log information maintained by the communications device of the present invention may be stored.

DETAILED DESCRIPTION OF THE EMBODIMENT(S)

Figure 1:
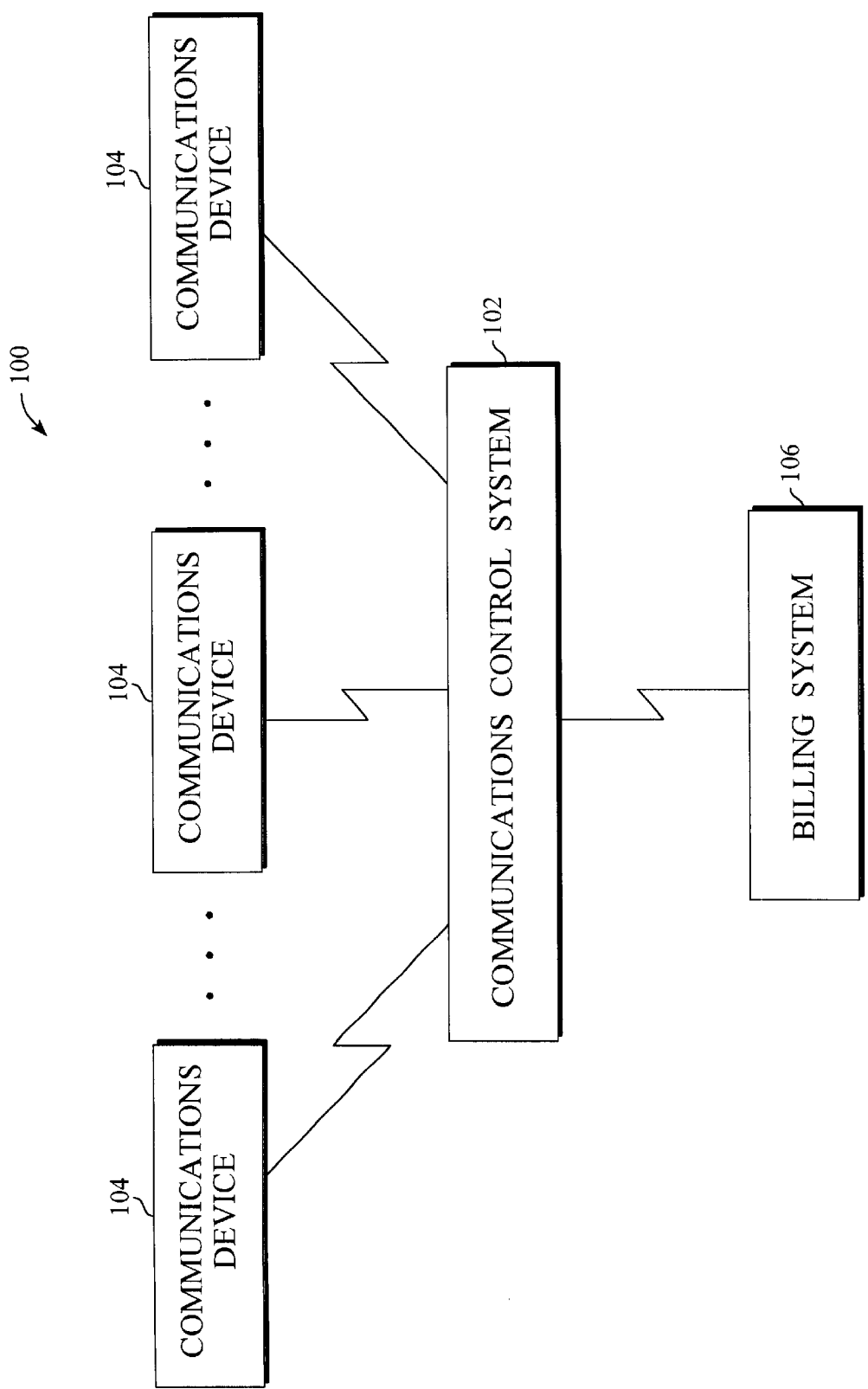
FIG. 1 is a block diagram representation of a prior art communications system.
Figure 2B:
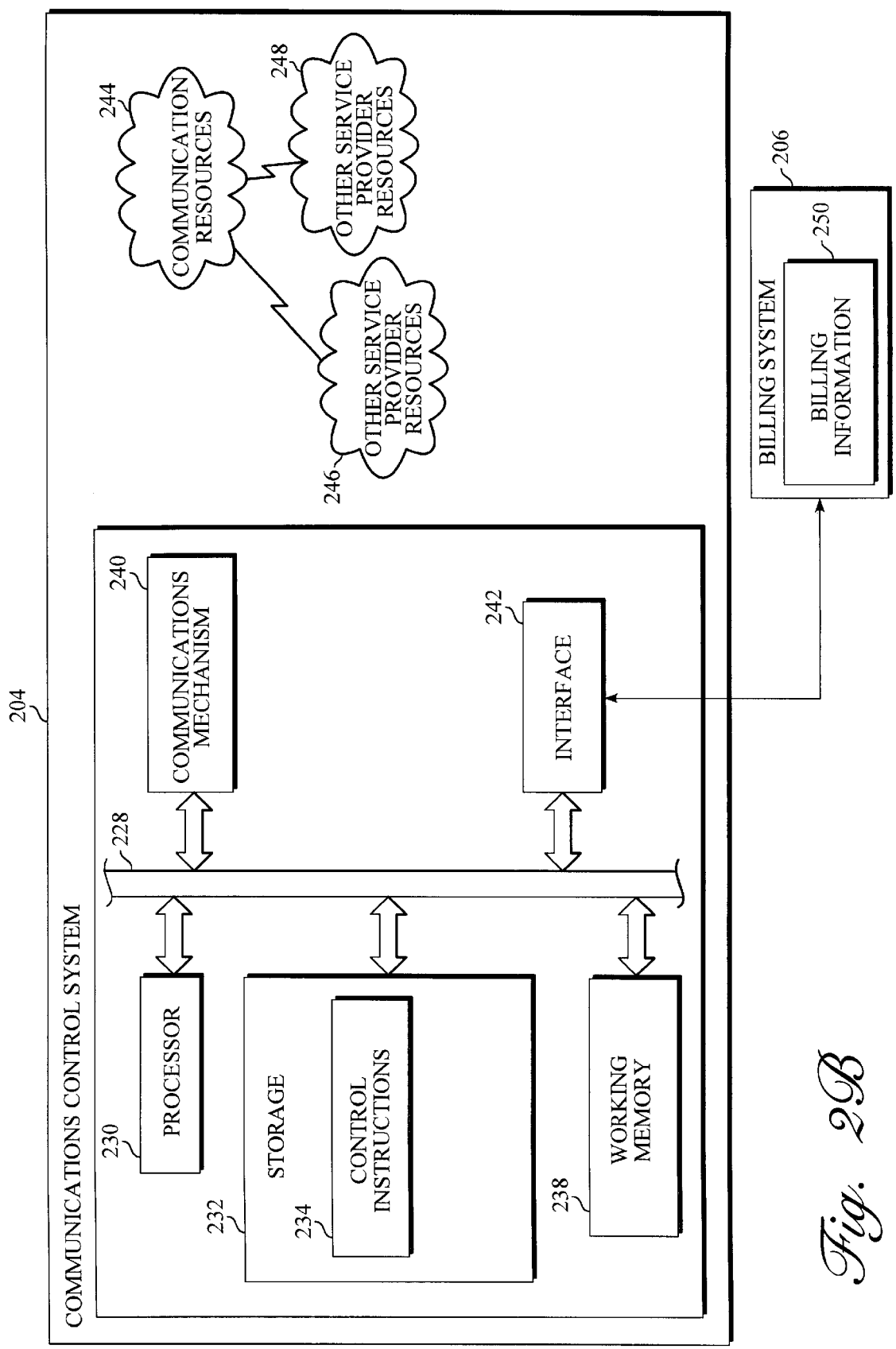

With reference to FIGS. 2a and 2b, there is shown a communications system 200 in which the present invention may be implemented, the system 200 comprising a plurality of communications devices 202, a communications control system 204, and a billing system 206. In system 200, the communications devices 202 are utilized by users to conduct communications. These communications are made possible by the control system 204, which provides the communications links needed by the devices 202 to communicate with each other. In addition to providing communications links, the control system 204 also interfaces with the billing system 206 to enable billing information 250 pertaining to the communications to be recorded. This information 250 enables the proper users to be billed for each of the communications.

According to the present invention, each of the communications devices 202 maintains a set of log information pertaining to each of the communications conducted using that device 202. As described further in a later section, this log information includes all of the information pertinent to the billing of the communications. Because this log information is maintained by each of the communications devices 202, the control system 204 and the billing system 206 are relieved of the burden of having to record information pertaining to a communication at the time that the communication is conducted. Even if the control system 204 and the billing system 206 fail to record information pertaining to a communication at the time that the communication is conducted, they can always obtain the information after the fact (i.e. after the communication has been conducted and terminated) from the communications device 202 that was used to conduct the communication. Thus, in effect, the log information makes it possible for the control system 204 and the billing system 206 to retroactively record information pertaining to one or more communications. In addition to updating the billing information 250 in the billing system 206, the log information may also be used to verify the accuracy of the information already stored in the billing system 206.

For purposes of the present invention, each of the communications devices 202 in system 200 may take the form of any device capable of sending and/or receiving communications, including but not limited to a telephone (land line or portable), a computing device (e.g. a computer, a personal digital assistant, etc.), audio/video conference equipment, a PBX system, a data terminal, and a facsimile machine. As used herein, the term "communication" refers broadly to any type of information transfer, including but not limited to voice/audio signals, video signals, text, and data. For example, a communication may be a telephone call, a page, a text message, an email message, an audio/voice message, a facsimile, and a data transmission/reception.

Whatever form the communications device 202 takes, it comprises the components shown in FIG. 2a. Specifically, device 202 comprises a main bus 208 and a plurality of components coupled to the main bus 208, including a processor 210, a storage 212, and a working memory 218. The storage 212 contains therein a set of operational instructions 214 which are executed by the processor 210 to carry out the methodology of the present invention. The working memory 218 is used by the processor 210 as temporary storage to facilitate the execution of the operational instructions 214 and the manipulation of data. In this embodiment, the functionality of the device 202 is derived from the processor 210 executing program instructions 214; however, it should be noted that the invention is not so limited. If so desired, the finctionality of the device 202 may be achieved by way of hardwired logic components. This and other modifications are within the scope of the invention.

In addition to the instructions 214, the storage 212 further contains a section 216 for storing log information pertaining to each communication conducted using the device 202. This log information comprises all of the information needed to properly bill a customer for a particular communication. In one embodiment, the log information is stored in the form of a table, such as that shown in FIG. 3, wherein the table comprises a plurality of rows and columns. Each row contains information pertaining to one particular communication, and each column contains information pertaining to one particular aspect of the communication.

With reference to FIG. 3, in the "communications ID" column, there is stored an identification for a particular communication. This identification is unique to that communication (unique for a particular device 202), and in one embodiment, takes the form of a sequence number. For example, if the previous communication had an ID of 97, then the ID for the next communication is 98. In addition to the "communication ID" column, table 216 further comprises an "address of other device" column for storing the address of the communications device with which the current device communicated in conducting a particular communication. This address may take on any one of many different forms, including but not limited to that of a phone number or an internet address such as a URL or an IP address. Table 216 further comprises a "start time" column and an "end time" column for storing, respectively, the start time and the end time of a particular communication. Together, the start time and end time provide an indication of the duration of the communication. In addition, table 216 further comprises an "Ack" column for storing an indication as to whether an acknowledgment has been received from the control system 102 in response to the transmission of a log record. This acknowledgment assures the communications device 202 that the log record has been received and processed by the control system 102. Based upon the value in the "Ack" column, the communications device 202 can determine whether a record may be deleted from the log table 216. In addition to the columns just described, table 216 may comprise other columns for storing other sets of information. In general, table 216 may include as many columns as are necessary to capture all of the information pertinent to the billing of a particular communication.

Referring again to FIG. 2a, the communications device 202 further comprises a user interface 222 and a communications mechanism 220, both of which are coupled to the main bus 208. The user interface 222 comprises all of the components necessary for receiving input from and providing output to a user, including but not limited to a microphone, a speaker, a keypad/keyboard, a display, a mouse, a touch sensitive screen, a trackball, and an alert mechanism (e.g. a ringer, a light). The communications mechanism 220 comprises all components necessary for communicating with the control system 204 and with other communications devices. Depending upon the type of the communications system 200, the form of the communications mechanism 220 may differ. For example, if system 200 is a land line telephone system, then mechanism 220 may be a modem or a telephone line interface. If system 200 is a wireless system, then mechanism 220 may be a wireless transmitting/receiving mechanism. Further, if system 200 is an internet or network based system, then mechanism 220 may be a network interface (e.g. an ethernet card). These and other forms are possible for the communications mechanism 220.

Communication between various devices 202 within the system 200 is made possible by the communications control system 204 (FIG. 2b). Specifically, the control system 204 provides the communications links that are necessary for the devices 202 to communicate with each other. Control system 204 also interacts with the communications devices 202 to receive therefrom the log information maintained by the devices 202. In addition, the control system 204 interfaces with the billing system 206 to provide updated billing information thereto. These and other functions may be performed by the control system 204.

In accordance with the present invention, the control system 204 comprises a main bus 228 and a plurality of components coupled to the main bus 228, including a processor 230, a storage 232, and a working memory 238. The storage 232 contains therein a set of control instructions 234 which are executed by the processor 230 to carry out the methodology of the present invention. The working memory 238 is used by the processor 230 as temporary storage to facilitate the execution of the control instructions 234 and the manipulation of data. In this embodiment, the functionality of the control system 204 is derived from the processor 230 executing program instructions 234; however, it should be noted that the invention is not so limited. If so desired, the functionality of the control system 204 may be achieved by way of hardwired logic components. This and other modifications are within the scope of the invention.

In addition to processor 230, storage 232, and working memory 238, control system 204 further comprises a communications mechanism 240. Communications mechanism 240 comprises all components necessary for communicating with the various communications devices 202, and for establishing the communications links needed by the devices 202 to conduct communications. Depending upon the type of the communications system 200, the form of the communications mechanism 240 may differ. For example, if system 200 is a land line telephone system, then mechanism 240 may be a telephone line switching system. If system 200 is a wireless system, then mechanism 240 may be a wireless receiving and broadcasting mechanism. Further, if system 200 is an internet or network based system, then mechanism 240 may be a packet switching system. These and other forms are possible for the communications mechanism 220.

In carrying out its functions, the communications mechanism 240 may have access to various communications resources. For instance, it may have access to its own communications resources 244, which may, for example, be a telephone network, a wide area network, or a network of wireless transmitting/receiving stations. In addition, it may have access to the resources of other service providers 246, 248, such as the networks of long distance providers and the wireless transmitting/receiving stations of other wireless service providers. For purposes of the invention, the communications mechanism 240 may draw upon any available resource to establish a communications link between two or more communications devices 202.

The control system 204 further comprises a billing system interface 242 coupled to the main bus 228 for sending information to and receiving information from the billing system 206. The form of the interface 242 will depend upon the actual implementation of the billing system 206. In the embodiment shown in FIG. 2, the billing system 206 is implemented as a system separate and distinct from the control system 204. It should be noted, though, that if so desired, the functionality of the billing system 206 may be incorporated wholly or in part into the control system 204. This and other modifications are within the scope of the invention.

Figure 4:
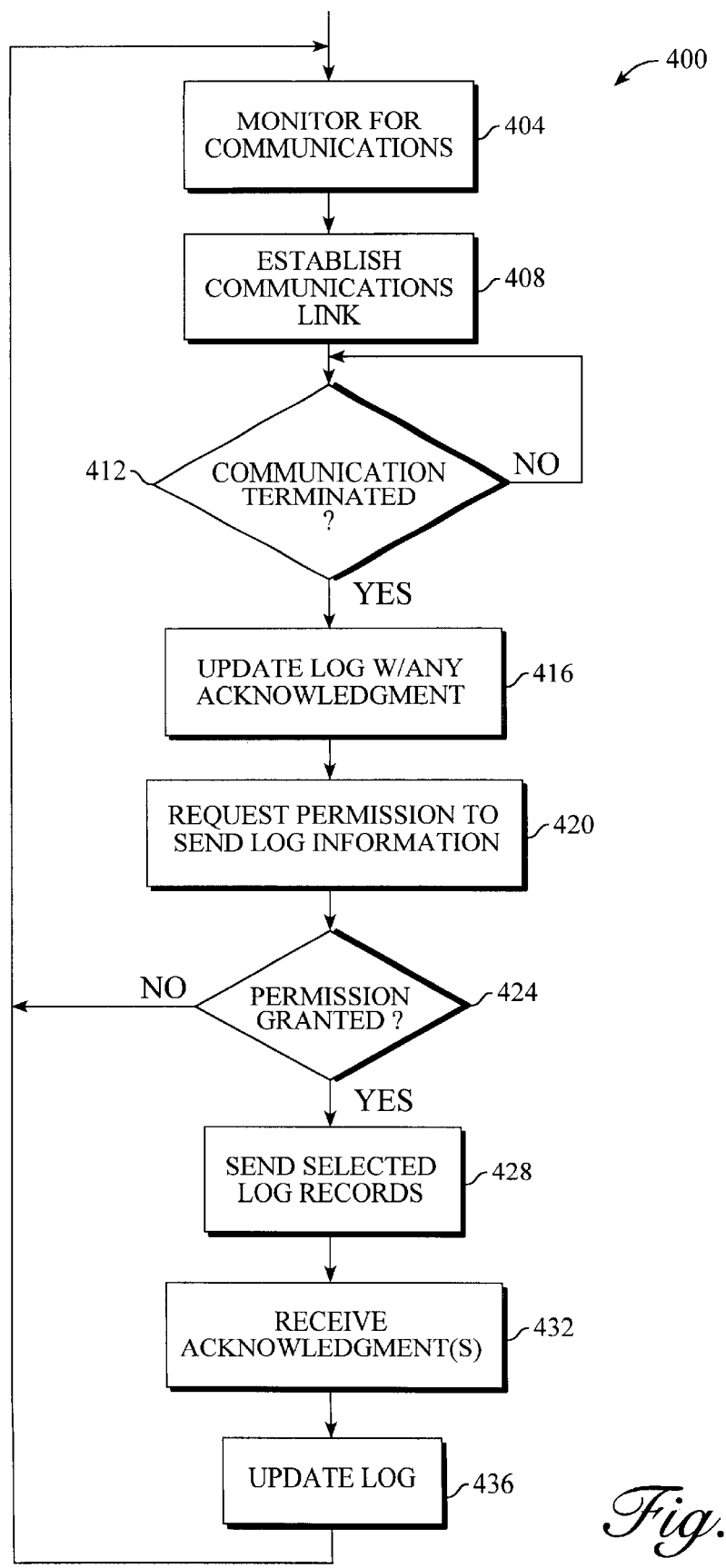
FIG. 4 is a flow diagram illustrating the operation of the communications device of the present invention.
Figure 5:
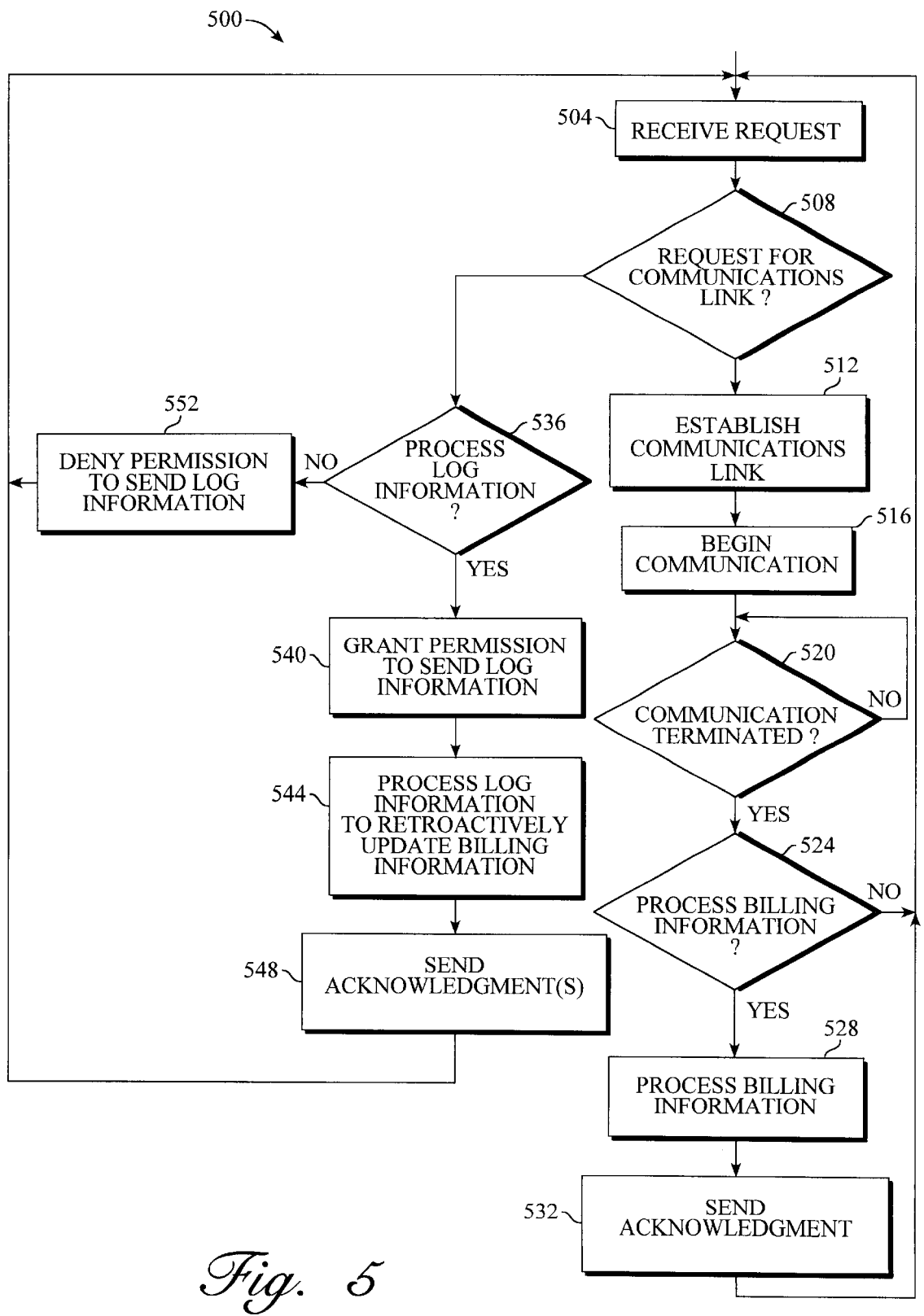
FIG. 5 is a flow diagram illustrating the operation of the communications control system of the present invention.

The physical embodiment of the present invention has been disclosed. With reference to the flow diagrams of FIGS. 4 and 5, the operation of the invention will now be described. The flow diagram of FIG. 4 illustrates the operation of the communications device 202, while the flow diagram of FIG. 5 illustrates the operation of the control system 204. As noted previously, the communications device 202 derives its functionality from the processor 210 executing the operational instructions 214 stored in the storage 212. Thus, the operations shown in FIG. 4 are carried out by the processor 210 under the direction of the operational instructions 214. Likewise, the control system 204 derives it functionality from the processor 230 executing the control instructions 234 stored in the storage 232. Thus, the operations shown in FIG. 5 are carried out by the processor 230 under the direction of the control instructions 234.

Referring first to FIG. 4, the processor 210 of the communications device 202 begins operation by monitoring (404) for communications. This involves monitoring the communications mechanism 220 for indications of an incoming communication. It also involves monitoring the user interface 222 for indications that the user wishes to send an outgoing communication. If either indication is detected, then the processor 210 proceeds to interact with the control system 204 to establish (408) a communications link. In the case of an incoming communication, this involves accepting a communications link that has been provided by the control system 204. In the case of an outgoing communication, this involves making a request to the control system 204 for a communications link. In either case, the processor 210 assigns a communication identifier (e.g. a sequence number) to the upcoming communication. Once a communications link is provided and established by the control system 204, the processor 210 allows the user to conduct a communication using the user interface 222 and the communication mechanism 220. At this point, the processor 210 records the start time of the communication and the address of the device with which it is communicating.

Thereafter, the processor 210 monitors (412) the communications mechanism 220 and the user interface 222 for indications that the communication has been terminated. If the communication has not been terminated, processor 210 continues to perform the monitoring function. However, if the communication has been terminated, then the processor 210 proceeds to update (416) the log information 216 stored in the storage 212 with information pertaining to this communication. Specifically, processor 210 inserts a new row into the log information table 216, the new row including the communication identifier assigned to the communication, the address of the communications device with which device 202 communicated, the start time of the communication, and the end time of the communication. In addition, the processor 210 checks for whether an acknowledgment has been received from the control system 204 indicating that the control system 204 has processed the billing information for this communication. In one embodiment, the control system 204 has the option of processing the billing information for a communication immediately (as will be discussed in a later section). If an acknowledgment has been received, then an affirmative indication is written into the "Ack" column of the new row. Otherwise, a negative indication is written into the "Ack" column. The communication is thus fully logged.

Thereafter, the processor 210 sends (420) a request to the control system 204 requesting permission to send to the control system 204 log information pertaining to past communications. This in effect grants the control system 204 an opportunity to retroactively update its billing information. If the response received (424) from the control system 204 is a denial of permission (which may occur, for example, if the control system is currently too busy), then the processor 210 loops back to (404) to monitor for another communication. On the other hand, if the response is a grant of permission, then the processor 210 sends (428) at least a selected portion of the log information 216 to the control system 204. In one embodiment, the processor 210 determines which records to send by checking the "Ack" column. More specifically, the processor 210 sends only those records (rows) for which acknowledgments have not been received, since these are most likely the records needed by the control system 204. After the selected records are sent, the processor 210 waits for acknowledgments from the control system 204 indicating that the sent records have been received and processed. Upon receiving (432) the acknowledgments, the processor 210 updates (436) the "Ack" columns of the sent records to indicate that the records have now been acknowledged and processed by the control system 204. At this point, the processor 210 may delete some or all of the acknowledged records in the log information table 216 to maintain the log information at a reasonable size. Thereafter, the processor 210 loops back to (404) to monitor for another communication. In the manner described, the communications device 202 implements the methodology of the present invention.

With reference to FIG. 5, the operation of the control system 204 will now be described. Processor 230 of the control system 204 begins operation by receiving (504) a request from a communications device via the communications mechanism 240. In response, the processor 230 determines (508) whether the request is a request for a communications link. If it is, then the processor 230 proceeds to (512) to establish a communications link between an initiating communications device and a destination communications device. Prior to establishing the link, however, the processor 230 verifies that the devices are authorized to access the resources of the system 200. This verification may be carried out using any known methodology. If the devices are authorized, then the processor 230 establishes the requested link. In doing so, the processor 230 may draw upon its own communications resources 244, as well as the resources of other service providers 246, 248. Once a communications link is established, the communication between the initiating device and the destination device is allowed to proceed (516). At this point, the processor 230 records certain information pertaining to the communication, such as the communication identifier(s) assigned to the communication, the addresses of the communications devices, and the start time of the communication.

Thereafter, the processor 230 monitors the communication to determine (520) whether it has been terminated. If the communication has not been terminated, then processor 230 continues to perform the monitoring function. However, if the communication has been terminated, then processor 230 determines (524) whether to process the billing information for this communication at this time. In making this determination, the processor 230 may take various factors into account, including the current load on the control system 204 and the current load on the billing system 206. If the processor 230 decides to process (528) the billing information at this time, it sends to the billing system 206 the information pertaining to the communication, including the unique identifier(s) associated with the communication, the addresses of as the communications devices, the start time, and the end time of the communication. This information is used by the billing system 206 to update the billing information 250. Once the billing information for the communication has been processed, the processor 230 sends (532) an acknowledgment to the communications devices to inform them that the billing information for the communication has been processed. (see 416 of FIG. 4). Thereafter, processor 230 loops back to (504) to receive another request.

Returning to (524), suppose that the processor 230 decides not to process the billing information for the communication at this time (for example, the system 200 may be currently overloaded). In such a case, the processor 230 foregoes processing the billing information and loops back to (504) to receive another request. In effect, the processor 230 is deferring the billing update process until a later time. This deferment is made possible by the fact that each communications device 202 maintains a log of the communications conducted using that device. With information pertaining to the communication already stored by the communications device 202, the control system 204 need not immediately register the communication with the billing system 206. Rather, the control system 204 can obtain the log information from the communications device 202 at a later time (after the communication has been conducted and terminated). No billing information pertaining to the communication is lost. This ability to defer the billing update process is a significant advantage of the present invention.

Returning now to (508), suppose that the request from the communications device is not a request for a communications link but rather is a request for permission to send log information pertaining to past communications. In response to such a request, the processor 230 determines (536) whether to process the log information at this time. In making this determination, the processor 230 may take into account various factors, including the current load on the control system 204 and the current load on the billing system 206. If the processor 230 decides not to process the log information at this time, then it sends a message to the communications device denying permission (552) to send the log information. Processor 230 thereafter loops back to (504) to receive another request. On the other hand, if the processor 230 decides to process the log information at this time, then it grants (540) the communications device permission to send the log information. Upon receiving the log information, the processor 230 processes (544) the information by sending it to the billing system 206. The log information may comprise all information pertaining to past communications, including the unique identifier(s) associated with the communications, the addresses of the communications devices, the start times, and the end times of the communications. Once received, the log information is used by the billing system 206 to retroactively update the billing information 250. Once the log information is processed, the processor 230 sends (548) one or more acknowledgments to the communications device to inform it that the log information has been processed. Thereafter, processor 230 loops back to (504) to receive another request. In the manner described, the present invention retroactively captures billing information pertaining to past communications to prevent loss of potential revenue.

Thus far, the invention has been described with the communications device 202 initiating interaction with the control system 204 to provide log information to the control system 204. While this is an advantageous embodiment, it should be noted that if so desired, the control system 204 may initiate communication with the communications device 202 to affirmatively request log information therefrom. This and other modifications are within the scope of the invention.

At this point, it should be noted that although the invention has been described with reference to specific embodiments, it should not be construed to be so limited. Various modifications can be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A method implemented by a communication control system, comprising:

establishing a communication link for use by a communication device in conducting a communication, the communication device maintaining a log of said communication which includes an indication of a duration of said communication;

determining whether to initiate updating of a set of billing information to include information pertaining to said communication;

in response to a determination not to initiate updating of said set of billing information, foregoing updating of said set of billing information;

interacting with the communication device at a later time to obtain at least a portion of said log of said communication which includes said indication of duration; and initiating updating of said set of billing information at said later time to include at least said portion of said log of said communication.

2. The method of claim 1, wherein determining comprises:

determining whether the communication control system is currently experiencing a heavy load.

3. The method of claim 1, wherein determining comprises:

determining whether a billing system is currently experiencing a heavy load.

4. The method of claim 1, further comprising:

sending an acknowledgment to the communication device indicating that said portion of said log has been successfully processed.

5. The method of claim 1, wherein the communication control system interacts with the communication device at said later time during which the load on the communication control system is relatively low.

6. A communication control system, comprising:

a mechanism for establishing a communication link for use by a communication device in conducting a communication, the communication device maintaining a log of said communication which includes an indication of a duration of said communication;

a mechanism for determining whether to initiate updating of a set of billing information to include information pertaining to said communication;

a mechanism for foregoing, in response to a determination not to initiate updating of said set of billing information, updating of said set of billing information;

a mechanism for interacting with the communication device at a later time to obtain at least a portion of said log of said communication which includes said indication of duration; and a mechanism for initiating updating of said set of billing information at said later time to include at least said portion of said log of said communication.

7. The communication control system of claim 6, wherein the mechanism for determining whether to initiate updating of said set of billing information comprises:

a mechanism for determining whether said communication control system is currently experiencing a heavy load.

8. The communication control system of claim 6, wherein the mechanism for determining whether to initiate updating of said set of billing information comprises:

a mechanism for determining whether a billing system is currently experiencing a heavy load.

9. The communication control system of claim 6, further comprising:

a mechanism for sending an acknowledgment to the communication device indicating that said portion of said log has been successfully processed.

10. The communication control system of claim 6, wherein said communication control system interacts with the communication device at said later time during which the load on the communication control system is relatively low.

11. A method implemented by a communication device, comprising:

maintaining in a local storage a set of log information pertaining to one or more past communications conducted using the communication device, said log information including, for at least one of said past communications, an indication of a duration of said past communication;

interacting with a communication control system to establish a communication link;

conducting a current communication using said communication link;

determining whether the communication control system wishes to receive at least a portion of said log information at the present time;

in response to a determination that the communication control system does not wish to receive said log information at the present time, foregoing sending of said log information to the communication control system; and in response to a determination that the communication control system wishes to receive said log information at the present time, sending at least a portion of said log information to the communication control system to retroactively update a set of billing information, wherein said portion of said log information includes said indication of duration of said past communication.

12. The method of claim 11, wherein sending comprises:

determining which portion of portions of said log information may be desired by the communication control system; and sending the desired portion or portions to the communication control system.

13. The method of claim 12, wherein determining which portion or portions may be desired comprises:

selecting at least one portion of said log information for which acknowledgment from the communication control system has not been received, said acknowledgment indicating that the portion has already been processed by the communication control system.

14. A communication device, comprising:

a storage;

a mechanism for maintaining in said storage a set of log information pertaining to one or more past communications conducted using the communication device, said log information including, for at least one of said past communications, an indication of a duration of said past communication;

a mechanism for interacting with a communication control system to establish a communication link;

a mechanism for conducting a current communication using said communication link;

a mechanism for determining whether the communication control system wishes to receive at least a portion of said log information at the present time;

a mechanism for foregoing, in response to a determination that the communication control system does not wish to receive said log information at the present time, sending of said log information to the communication control system; and a mechanism for sending, in response to a determination that the communication control system wishes to receive said log information at the present time, at least a portion of said log information to the communication control system to retroactively update a set of billing information, wherein said portion of said log information includes said indication of duration of said past communication.

15. The communication device of claim 14, wherein the mechanism for sending comprises:

a mechanism for determining which portion of portions of said log information may be desired by the communication control system; and a mechanism for sending the desired portion or portions to the communication control system.

16. The communication device of claim 15, wherein the mechanism for determining which portion or portions may be desired comprises:

a mechanism for selecting at least one portion of said log information for which acknowledgment from the communication control system has not been received, said acknowledgment indicating that the portion has already been processed by the communication control system.

* * * * *